United States Patent [19]

Holroyd et al.

[11] Patent Number: 4,738,738
[45] Date of Patent: Apr. 19, 1988

[54] MANUFACTURE OF VEHICLE TIRES

[75] Inventors: Eric Holroyd, Nr. Knutsford; James N. McGlashen, Winstanley, both of England

[73] Assignee: Apsley Metals Limited, United Kingdom

[21] Appl. No.: 854,652

[22] Filed: Apr. 15, 1986

Related U.S. Application Data

[63] Continuation of Ser. No. 566,992, Dec. 30, 1983, abandoned.

[30] Foreign Application Priority Data

Dec. 21, 1983 [GB] United Kingdom ............... 8301098

[51] Int. Cl.$^4$ .................... B29D 30/58; B29C 35/02
[52] U.S. Cl. .................... 156/129; 156/127; 156/421.6; 264/326; 425/49
[58] Field of Search ............ 156/110.1, 111, 117, 156/123, 125, 126, 127, 128.1, 128.6, 129, 130, 130.7, 394.1, 397, 421.6, 406.4, 406.2; 425/85, 46, 49, 28 R, 383; 264/271.1, 325, 326, 501

[56] References Cited

U.S. PATENT DOCUMENTS

| | | | |
|---|---|---|---|
| 1,488,343 | 3/1924 | Hoffman | 156/130.7 |
| 3,143,450 | 8/1964 | Barber et al. | 152/129 |
| 3,819,791 | 6/1974 | Ayers | 156/119 |
| 3,837,986 | 9/1974 | Gorter et al. | 156/128.1 |
| 3,854,852 | 12/1974 | Carter | 425/28 |
| 4,039,365 | 8/1977 | Takasuga et al. | 156/406.2 |
| 4,111,619 | 9/1978 | Kent | 425/43 |
| 4,157,933 | 6/1979 | Goodfellow | 156/414 |
| 4,259,129 | 3/1981 | Schmidt | 156/125 |
| 4,268,330 | 5/1981 | Komatsu et al. | 156/111 |
| 4,301,850 | 11/1981 | Schneider et al. | 264/271.1 |
| 4,448,620 | 5/1984 | Fink | 264/326 |

FOREIGN PATENT DOCUMENTS

| | | |
|---|---|---|
| 800552 | 3/1943 | France . |
| 1249870 | 11/1960 | France ................. 264/326 |
| 1524158 | 5/1968 | France . |
| 2272825 | 12/1975 | France . |
| 2292581 | 6/1976 | France . |
| 91553 | 7/1972 | German Democratic Rep. . |
| 907692 | 10/1962 | United Kingdom . |
| 1213574 | 11/1970 | United Kingdom . |
| 1315459 | 5/1973 | United Kingdom . |
| 1389563 | 5/1975 | United Kingdom . |
| 1471547 | 4/1977 | United Kingdom . |
| 1561224 | 2/1980 | United Kingdom . |
| 1592854 | 7/1981 | United Kingdom . |

Primary Examiner—Jerome Massie
Assistant Examiner—Ramon R. Hoch
Attorney, Agent, or Firm—Stevens, Davis, Miller & Mosher

[57] ABSTRACT

A method and apparatus for building a tire comprising fitting a patterned cavity of a tread mould with unvulcanized tread composition, shaping the radially inner surface of the tread to a first profile to accommodate a tread reinforcement breaker, consolidating the assembly and shaping its radially inner surface to a second profile, fitting a tire carcass into the second profile, completing the tire assembly, vulcanizing the assembly in the tread mould and removing it from the mould. The method includes various means for fitting the components for consolidating them and for forming the required profiles for subsequent components.

24 Claims, 11 Drawing Sheets

MANUFACTURE OF VEHICLE TIRES

This application is a continuation of application Ser. No. 566,992, filed Dec. 30, 1983, now abandoned.

This invention relates to the manufacture of vehicle tires and the apparatus used therefor.

Vehicle tires are assembled from many separate components each of which are intended to be precisely located and accurately shaped within the completed tire. Maintaining the required shapes and obtaining sufficient accuracy in the positions of the components is extremely difficult in practice because of the readily deformable nature of the unvulcanized material whcih is used and the gross changes in shape which are impressed on the tire during assembly.

Conventionally, tires are assembled or at least partially assembled, on a flat drum and are then shaped up into the required toroidal shape. Subsequently the tread reinforcement and the tread rubber are fitted to complete a patternless green carcass which is then put into a patterned mould where internal pressure is used to push the tread rubber into the mould pattern. In the case of large tires such as truck or earthmover tires large rubber volumes are moved in this final moulding stage. The shaping and moulding stages both cause component movement and component reshaping each of which cannot be precisely controlled and the results are inconsistent tires.

It is an object of the present invention to provide a method and apparatus for manufacturing vehicle tires which provide effective component location on assembling the tire and retention of component positions on vulcanizing the tire.

According to one aspect of the present invention a method of building a pneumatic tire comprises filling the tread cavity of a patterned annular tread mould with unvulcanized tire tread composition so that the tread is formed with the required final pattern and retained thereby in the mould, shaping the radially inner surface of the tread to a first profile having the shape required to accommodate and locate a tread reinforcement breaker, fitting the breaker into the prepared first profile, consolidating the tread and breaker assembly, shaping the radially inner surface of the assembly to a second profile having the shape required to accommodate a tire carcass, positioning the tire carcass, which is not fully shaped, within and coaxial to the annular tread mould, further shaping the carcass so that the carcass forms a crown which contacts and adheres to the second profile, completing the tire assembly, vulcanizing the assembled tire and removing the completed tire from the tread mould.

Preferably the tread mould is heated prior to filling the tread cavity with unvulcanized tread composition to assist in filling the cavity particularly around the tread pattern. Vacuum may also be applied.

The tread cavity may be filled by laying a strip of material into the cavity of the annular tread mould in a circumferentially-extending direction but more preferably the tread composition is formed into a ring upon a support member remote from the tread mould and the support member is then moved axially into the mould and radially expanded to effect filling of the tread cavity by pressing the tread composition into the cavity. The tread composition subsequently may be consolidated into the mould by various means including a consolidating head which comprises a substantially continuous rigid surface. The consolidation step then includes the most important shaping stage to provide the required first profile to accept and locate the next component in the tire assembly.

The breaker may comprise two or more layers of breaker reinforcement fabric which may be steel or textile or any other material used in the art and these are preferably fitted into the prepared first profile one layer at a time. Alternatively a breaker of more than two layers may be assembled on a carrier member which is remote from the tread mould which is then used to fit the breaker assembly. A breaker cushion may also be fitted to complete the breaker assembly. Note that a profiling operation is subsequently used after fitting the breaker cushion to shape the radially inner surface to accept the next components of the tire.

The breaker assembly may be formed in the usual manner by butt joining each strip of fabric with the joint at an acute angle and positioning each breaker over the previous one with the joints shaped around the circumference.

While a conventionally built tire carcass including all its bead components may then be shaped into the tread and breaker assembly it is much preferred to use a novel process for the carcass assembly which, combining with the tread and breaker assembly gives a much improved tire build. The preferred process comprises assembling a simplified tire carcass which is without bead chafer strips, toe strips and sidewalls and to shape this simplified carcass into the tread and breaker assembly. This may be done by any shaping method including the use of a shaping bladder. Following shaping of the simplified carcass into the tread and breaker assembly the toe strips, chafers and sidewalls may be fitted each being preshaped to their final shape in the completed tire and each being fitted without substantially changing that shape.

The assembly of pre-shaped components, which are not subsequently reshaped during tire build or vulcanizing, gives great advantage in that rubber is not moved and the components therefore remain as desired and undisturbed by other components being moved or fitted to the assembly. The only components which are assembled and then reshaped are the liner and carcass reinforcement ply.

According to another aspect of the present invention an apparatus for building a pneumatic tire comprises an annular tread mould having a tread cavity provided with a mould pattern to form the required tire tread pattern, means for filling said cavity with tire tread composition to form a tire tread, first consolidating and shaping means to shape the radially inner surface of the tread to a first profile, means for fitting a breaker into a predetermined position in the first profile and second consolidating and shaping means to shape the radially inner surface of the tread and breaker assembly to a second profile shape to accept a tire carcass.

Preferably the means for filling the tread mould with tire tread composition comprises a cylindrical carrier drum which is diametrally expandable. The carrier drum preferably has a surface comprising an air bag to provide means for increasing the diameter by means of air pressure.

The consolidating and shaping means preferably comprises a substantially continuous cylindrical surface having a required cross-sectional shape for the profile to be formed.

The breaker fitting means preferably comprises a cylindrical carrier drum which may be folded so that its outer radius varies but the circumferential extent of the carrier drum remains constant so that the breaker may be reduced in overall diameter for fitting into the tread mould.

The filling, fitting and shaping means may be mounted in service units which are mounted around the assembly machine in a conventional manner such that each service unit may be brought in turn to the tire assembly area where the annular tread mould is supported.

Further aspects of the present invention will be apparent from the following description, by way of example only, of one embodiment of the present invention in conjunction with the attached diagrammatic drawings in which.

Figure 1:
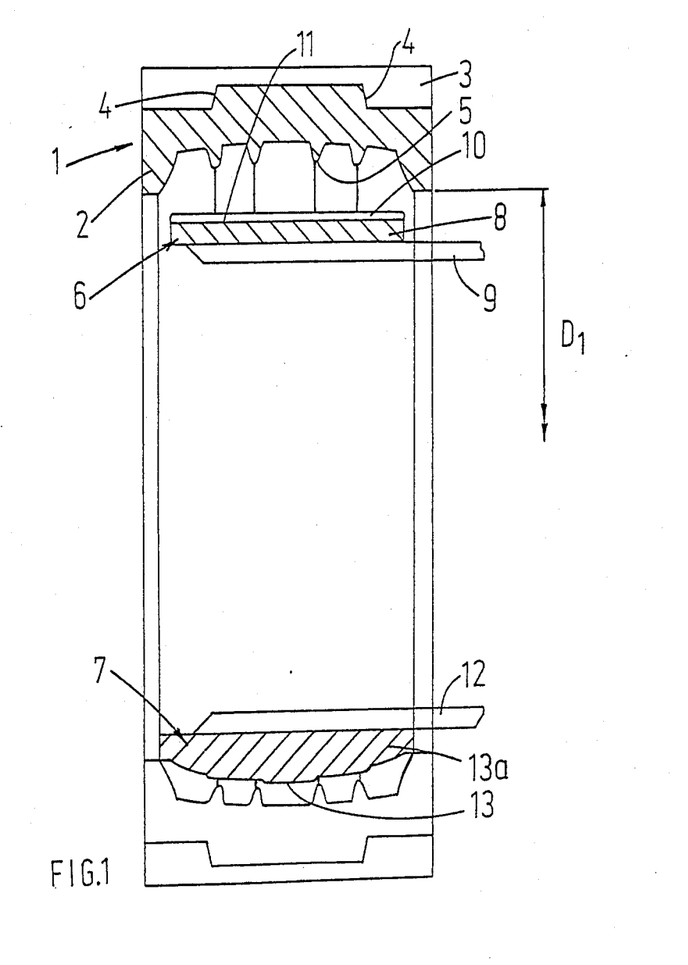
FIG. 1 is a cross-section of a patterned annular tread mould.

The tread mould 1 shown in part in FIG. 1 is for a truck radial tire and comprises a series of mould segments 2 positioned end-to-end located within a steel support ring 3 so that the required annular tread mould cavity is formed. The mould segments 2 are locked into place but may be released when required by releasing their locking bolts (not shown) and are further located in the support ring 3 by shoulders 4. The radially inner surface of the tread mould segments 2 has a female tread mould pattern 5 for the tire tread to be made.

The tread mould 1 is used for the complete assembly of a tire and also to hold it for vulcanization and it will be appreciated therefore that several tread moulds 1 are required. These are brought one at a time to a tire building machine which provides a support for the tread mould, means to rotate it and a series of service units each of which can be used to perform the successive tire building operations. In order not to unduly complicate the description the service units will only be described in outline giving only sufficient information to make clear the principle of operation of each service unit. Alternative means of carrying out the steps of some of the service units will be apparent and the invention is not to be understood as to be limited to the service units described.

The first service unit has a cylindrical drum 6 for carrying and inserting tread rubber and a first consolidating head 7 which are shown in the upper and lower parts of FIG. 1 respectively.

The cylindrical drum 6 comprises a steel tube 8 mounted upon a series of support arms 9 and a substantially flat air bag 10 which extends around the outer cylindrical surface 11 of the tube 8. The overall diameter of the cylindrical drum 6 over the collapsed air bag is, as shown, sufficiently less than the inner diameter $D_1$ of the tread mould 1 so that the drum 6 can carry the tread rubber into the tread mould 2.

The consolidating head 7 comprises a series of interconnected rigid forming shoes 13a which are positioned end-to-end to provide a circumferentially-extending cylindrical surface 13. The forming shoes 13a are mounted on a support frame 12 which provide in addition means to change the outer diameter of the consolidating head 7 between a lower or collapsed effective diameter which allows insertion of the consolidating head 7 into the tread mould 1 and an outer diameter which is the diameter of the inside of the tread component of the tire as will be described in the next paragraph. Most importantly the cross-sectional shape of the outer surface 13 is stepped as shown.

The first service unit operation is as follows.

Figure 2:
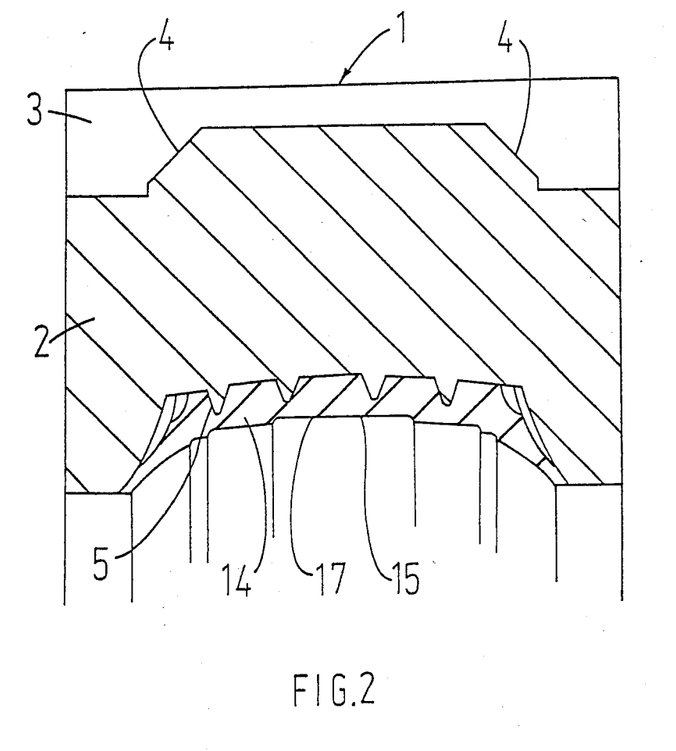
FIG. 2 shows the mould of FIG. 1 with a tread in position.

Firstly the cylindrical drum 6, with the air bag 10 collapsed, is positioned away from the tread mould 1 and a tread strip of unvulcanized tread rubber composition is placed around the outer diameter. The tread strip may be a single extrusion of the required cross-section joined end-to-end or more preferably a winding of a strip of tread compound used to build up the tread strip section. The cylindrical drum 6 carrying the tread strip is then moved axially into the tread mould 1 which is pre-heated to a temperature of 80°–100° C. and the air bag 10 is inflated. This presses the tread strip against and into the pattern 5 in the tread mould 1 whilst expanding the annular tread strip. Vacuum is applied to the mould cavity and when the tread strip is fully pressed into the pattern 5 the air bag 10 is deflated and the cylindrical drum 6 of the first service unit is withdrawn axially. The second stage operation is to move the consolidating head 7 into the tread mould 1 and to expand the shoes 13a to press the tread rubber fully home into the tread pattern 5 and most importantly to impress on the tread strip the stepped cross-sectional shape of the outer surface 13. These process steps are greatly assisted by the fact that the mould is preheated. The consolidating head 7 is then withdrawn and the first servicing unit swung to one side of the tread mould leaving the assembly of tread mould 1 and tire tread 14 as shown in FIG. 2 with the stepped inner profile 15 formed in the radially inner surface of the tire tread 14.

Figure 3:
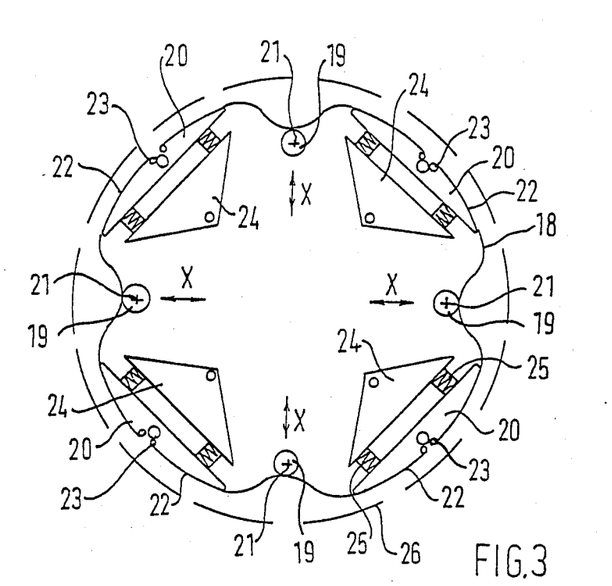
FIG. 3 shows a breaker fitting drum assembly.

Meanwhile a second service unit comprising a breaker fitting drum assembly and a second consolidating head is prepared. The breaker fitting drum assembly may be as shown in FIG. 3 and then comprises a circular band 18 of reinforced rubber material moulded upon a series of eight supporting members 19 and 20. The supporting members are of two types, firstly four cylindrical bosses 19 and secondly, four support segments 20 which are all mounted on a side frame and are movable thereon in a predetermined pattern to be explained.

The cylindrical bosses 19 are each rotatably mounted on a projecting shaft 21 and the circular band 18 is attached across the width of the band 18 to each boss 19 so that radially inward movement of the cylindrical bosses 19 in the directions shown by arrows X pulls the band 18 inwards to the position shown in FIG. 3. The projecting shafts 21 are mounted on the side frame with the necessary drive system for this movement (not shown).

The support segments 20 have an outer curved surface 22 of the same radius of curvature as the full circle of the circular band 18 when fully extended and at the centre of the curved surface there are four sets of three band retaining pins 23. The band 18 passes around the pins as shown and this arrangement allows initial adjustment of the band 18 circumference by relative movement of the retaining pins 23. Each support segment 20 is mounted on a triangular base member 24 by being slidably mounted on a pair of pillars 25 which project from the base member 24. Springs are provided to urge the support segments 19 radially outwards and the base members 24 are themselves slidably mounted on the side frame to allow initial adjustment for setting up.

Thus with all the bosses in the outermost positions the spring-loaded support segments 20 combine to act outwards and position the band 18 in a circular formation as shown by the broken line 26. An alternative position is obtained by moving the bosses 21 radially inwards through movement X and the band 18 then pulls the segments 20 inwardly against the springs to give the position shown in full lines in FIG. 3 when the overall diameter is smaller but the path length around the surface of the band 18 remains the same as before.

The main mountings of the projecting shafts 21 and the base members 24 to the side frame can be adjusted to fit different lengths of bands 18 so that different diameter components may be handled.

Furthermore, the adjustment allowed by the sets of three pins 23 may be used for initial setting up or to accept or allow for circular components of slightly varying diameter or length in which case the expansion effected by the movement X may be used to correct deficiencies in diameter and correctly insert the breaker component.

Thus the circular band 18 and the associated components provide a carrier which can be varied in radius without changing the carrying length of the circular band 18. The crown curvature of the cross-section of the circular band 18 which is flat here may be curved and is determined by the initial cross-section of the circular band and the support members 19 and 20.

The second service unit also includes a consolidating head which may be of the same type as that fitted to the first service unit.

Figure 4:
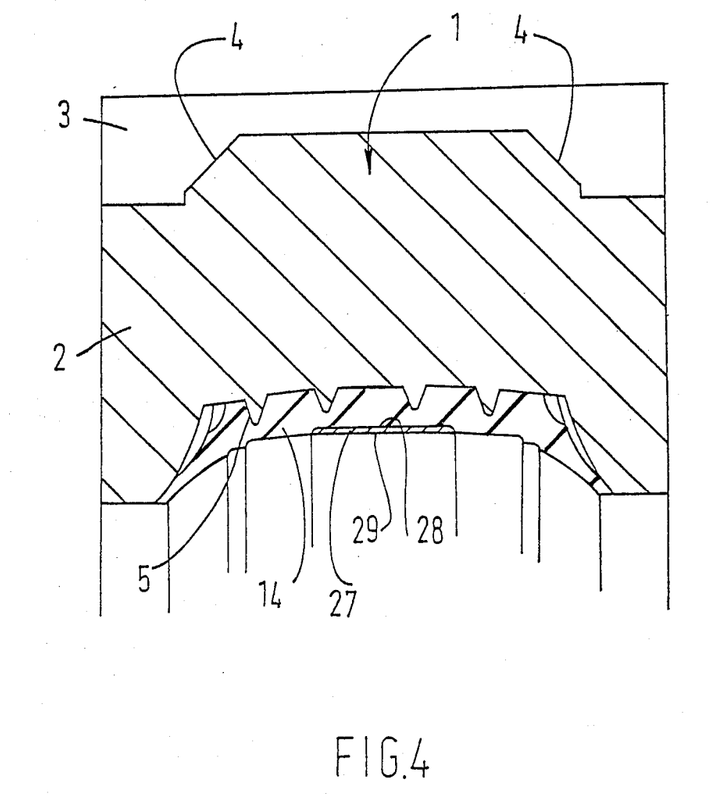
FIG. 4 shows the assembly of FIG. 2 with a fourth breaker ply in position.

The second service unit is operated as follows: Firstly the breaker fitting drum assembly is positioned in its full circle state with the band 18 in the full circular shape 26. A fourth and outer breaker reinforcement strip 27 of steel fabric is then assembled on the band 18 using it as a solid drum. The cords are joined by the usual edge-to-edge breaker joint and the joint is rolled to complete it. The breaker fitting drum is then collapsed so that the band 18 and the breaker on it take up the folded solid line shape shown in FIG. 3. The breaker fitting drum and breaker are then moved axially into the tread mould 1 and the support 21 and bosses 19 are moved radially outwards to reshape the band 18 to its original fully circular shape 26 whereupon the breaker 27 is fitted into the central recess 28 in the first profile 15 left after the tread consolidation and shaping operation. Then the second consolidating head consolidates the assembly to exclude any air trapped between the ply 27 and the tread strip 14 and also to leave the sub-assembly with the shaped inner profile 29 shown in FIG. 4.

Figure 5:
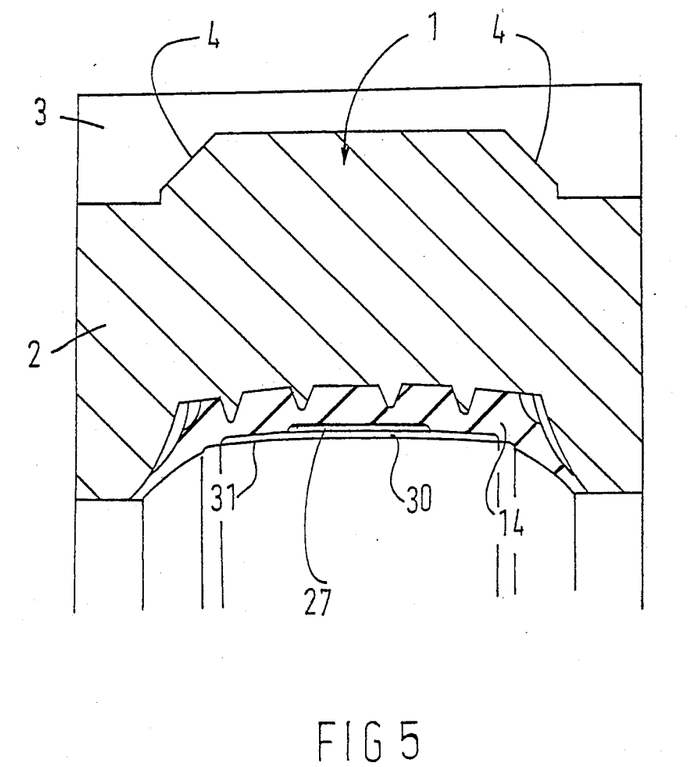
FIG. 5 shows the assembly of FIG. 4 with a third breaker fitted.

Meanwhile a third service unit of the same type as the second service unit is prepared by loading the third, or next, breaker ply 30 which is a full width ply. This is fitted and consolidated to leave the profile 31 shown in FIG. 5.

Figure 6:
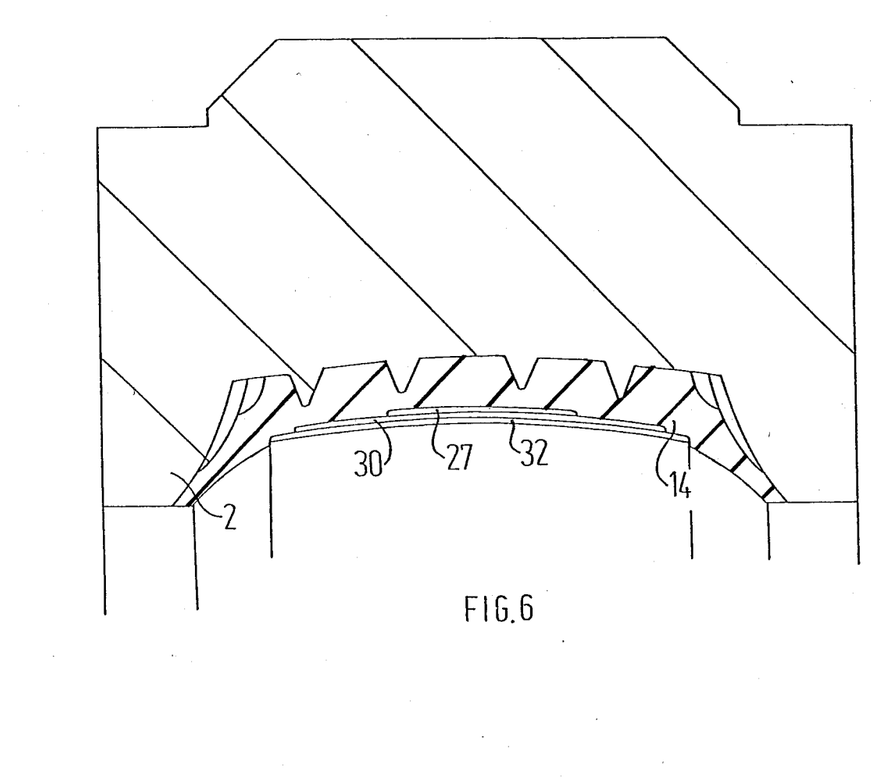
FIG. 6 shows the assembly of FIG. 5 with a second breaker fitted.
Figure 7:
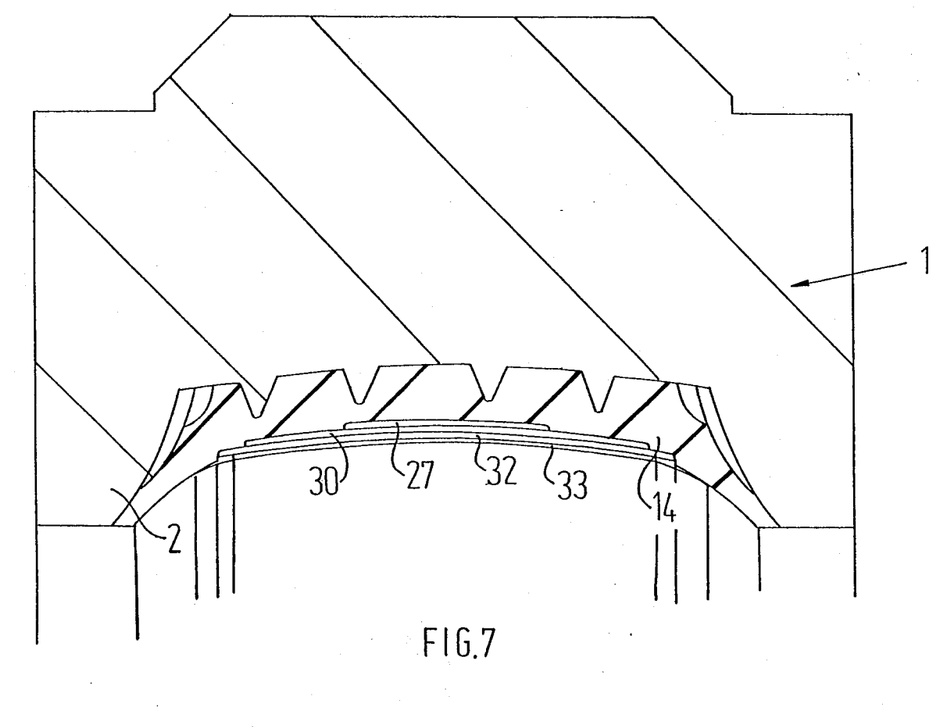
FIG. 7 shows the assembly of FIG. 6 with a first and final breaker fitted.

The remaining breaker plies, i.e. the second and first full width breaker plies 37 and 33 are then fitted by second type servicing units each of which completes the assembly by consolidating and leaving the inner profile pre-shaped to accept and accurately locate the next component. The tire assembly is shown at these stages in FIGS. 6 and 7 and by the stage of FIG. 7 the breaker and tread assembly is completed with each component fitted in the shape and position required in the final tire and without movement of any component as a later component is fitted.

Figure 8:
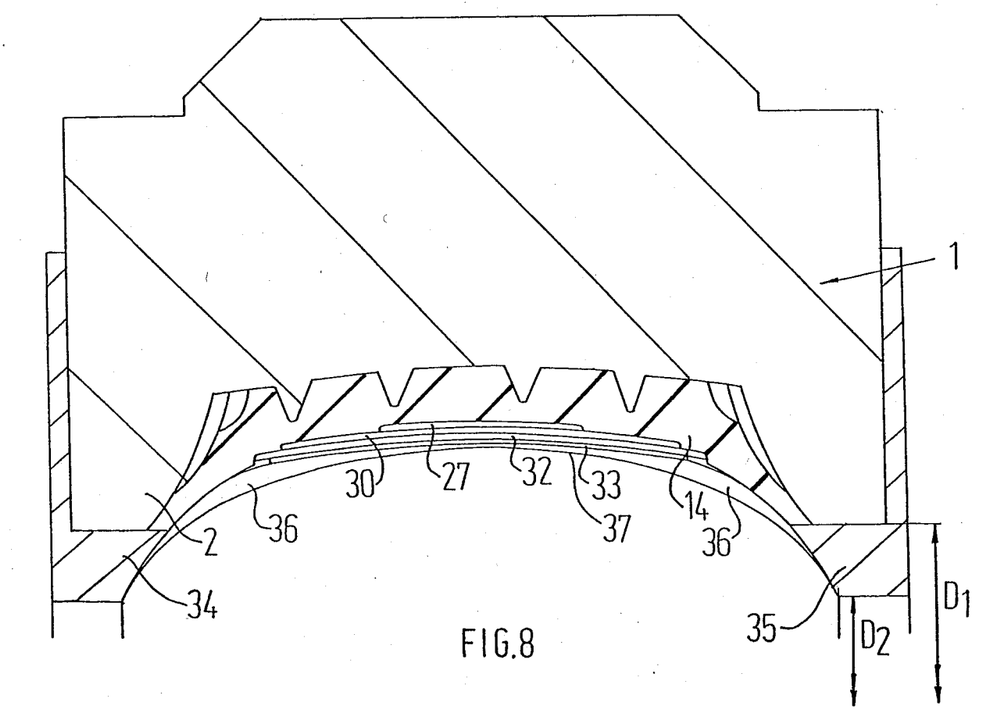
FIG. 8 shows the assembly of FIG. 7 with breaker cushion fitted.

The next operation is to fit a pair of annular mould shoulder pieces 34 and 35 to the tread mould 1. These are shown in FIG. 8 and provide radially inwardly extending extensions for the mould sides to support the next component which is a breaker cushion 36. The breaker cushion 36 has a pair of thick shoulders and a thin centre region and is assembled onto another service unit at a diameter less than $D_2$ the diameter of the shoulder pieces 23 and 24. This service unit may be of the first type used for the tread compound and has a single inflatable bag and a consolidating head which has a crown shaped cross-section to give the finished profile 37 shown in FIG. 8.

Figure 9:
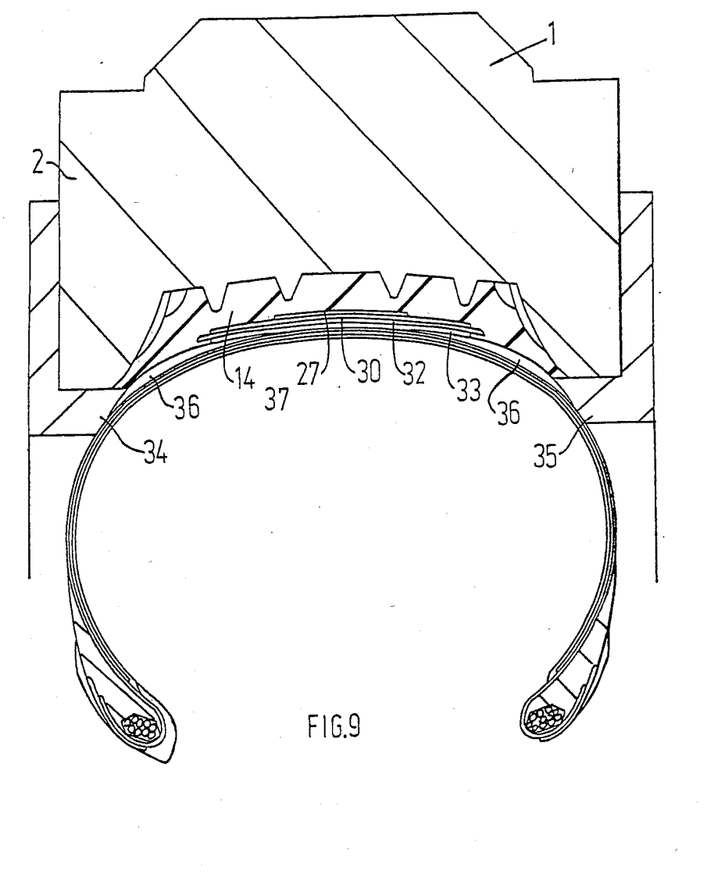
FIG. 9 shows the assembly of FIG. 8 with a partially assembled tire carcass positioned against the tread and breaker assembly.

The tread and breaker assembly is then ready for the tire carcass which is built separately using a flat build machine but simplifying the construction. The simplification is to assemble only the inner lining, ply insulation, carcass reinforcement ply, beads and apices and not assemble the bead chafer strips, toe strips or sidewall components on the flat drum. Thus the carcass assembled flat has only the essential reinforcement components in place when it is then shaped to a toroid. Shaping is stopped when the overall diameter is just less than the diameter $D_2$ and then the simplified carcass 38 is loaded to the building machine and moved axially into the tread mould 1 and the pre-assembled tread and breaker package. Final shaping is then effected so that the simplified carcass 38 is joined to the tread and breaker package as shown in FIG. 9.

Figure 10:
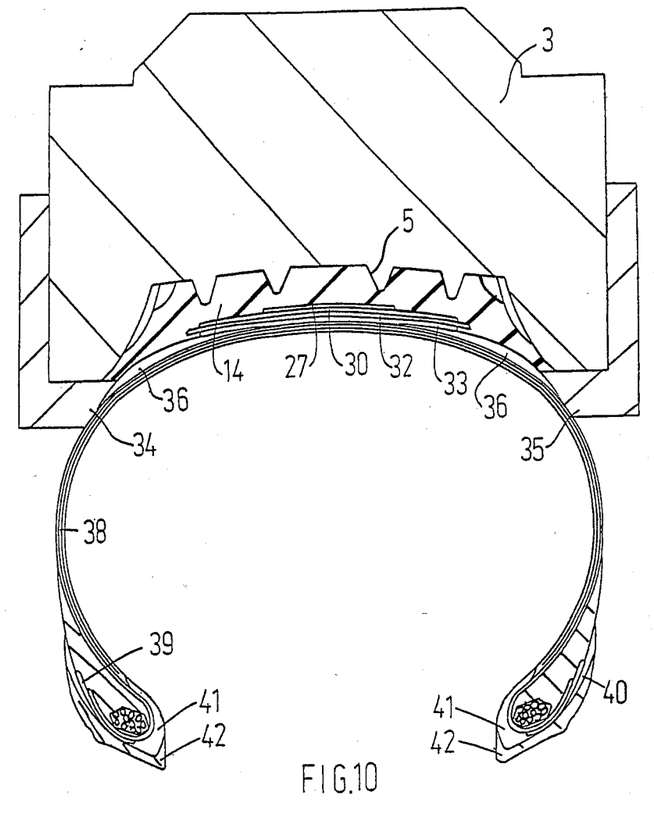
FIG. 10 shows the assembly of FIG. 9 with the tire assembly completed—apart from sidewall.

Both the above carcass shaping stages may be carried out by any of the well-known shaping methods including the preferred diaphragm-less air inflation systems. The remaining components of the tire are then fitted including the bead fillers 39 and 40, and the remaining bead components 41,42. Each of these components is made in the shape required in the finished tire and carried on a carrier plate to the tire building machine where the component is fitted without being changed in shape. The construction of the tire has then reached the stage shown in FIG. 10.

The mold shoulder pieces 34 and 35 are detached from the tread mould. Tire sidewalls 43 and 44 are then fitted, with vacuum applied to the mould to remove air one to either side of the tire each carried in a sidewall plate 45 which engages the inner diameters $D_1$ of the tread mould segments 2. Once again the sidewalls 43 and 44 are formed in their respective sidewall plates 45 so that they are always the required annular shape and deformation or stretching is not required for assembly to the tire.

Figure 11:
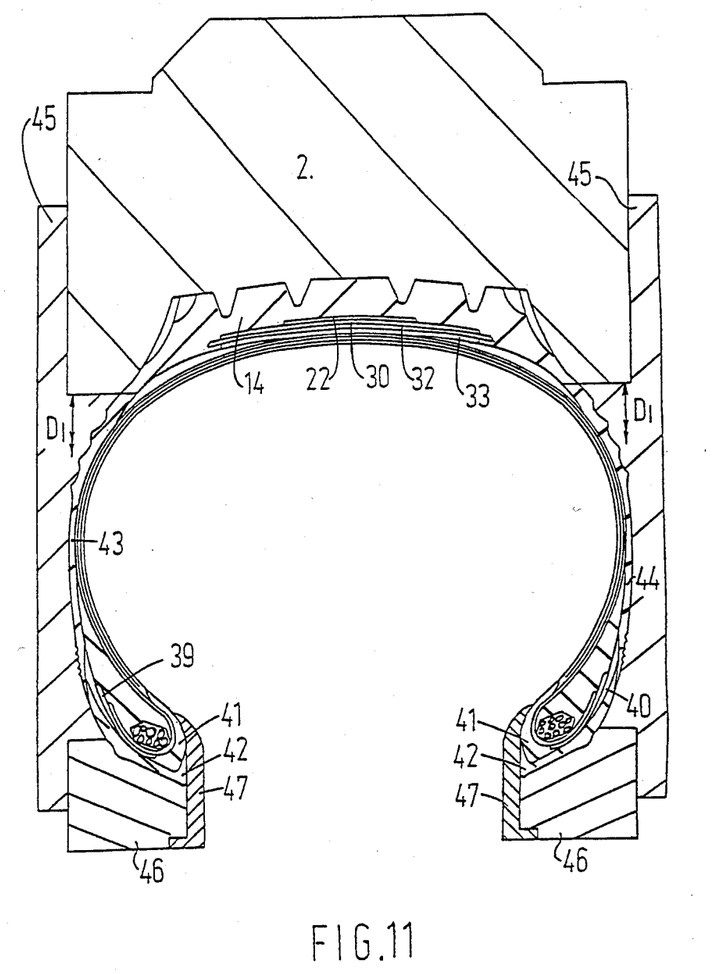
FIG. 11 shows the assembly of FIG. 9 with the tire carcass assembly and the mould completed for tire vulcanisation.

Finally clip rings 46 and 47 are attached to the sidewall plates 45 to complete the tire mould by retaining the tire bead shape. The complete assembly of tread mould 1, sidewall plates 45, clip rings 46 and 47 and the tire assembly contained therein is then as shown in FIG. 11 and is taken from the building machine and taken for tire vulcanization and after vulcanization and cooling the mould components are dismantled to allow removal of the completed tire.

This method of tire manufacture provides a tyre assembly in which components are not displaced as the result of shaping or tread pattern forming operations. Furthermore even components such as sidewalls, breaker cushion and chafer strips are made in the shape which is required in the completed tire and therefore the components can be more accurate and more consistent than hitherto. These advantages are particularly found in the tread and breaker package where the profiling operations to prepare for the locations and shapes of each successive component are a particular feature of this invention.

Alternative means may be used for filling the tread mould with unvulcanized tread composition including injection and transfer moulding directly into the tread mould 1. Other means include strip winding directly into the mould either by rotating a strip feed device or rotating the tread mould around a strip feed device. A single wide strip may also be laid into the mould and joined end-to-end. Alternative consolidation means may be used to the full width solid former described.

Figure 12:
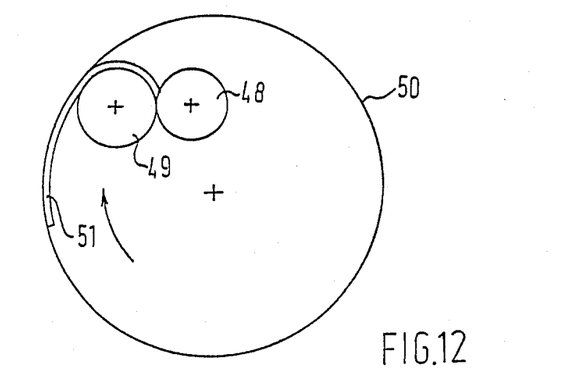
FIG. 12 shows an alternative breaker fitting assembly.

An alternative breaker fitting device to replace the breaker fitting drum of FIG. 3 is shown in Figure 12. This comprises a pair of breaker material feed rollers 48 and 49 which may be driven around a circular path 50 and which provide a cassette to lay a strip of tire breaker fabric 51 into the tire tread mould 1. The cassette is positioned within the tread mould and rotated to lay a full turn of the breaker ply material and form a butt joint. Construction and shaping is then effected as before.

Other methods may be used to fit the breaker plies into the tread ring such as for example winding a narrow strip or a single cord into the mould and using sufficient turns to build up the full breaker width and the required number of layers. The strip or cords may be laid zig-zag to give acute angled reinforcement and at 0° to the bead centre line as required for the breaker design.

The method of the present invention also may be applied to other tires from the smallest car sizes to the largest earthmover sizes as well as the truck tire described.

We claim:

1. A method of building a pneumatic tire comprising filling the tread cavity of a patterned annular tread mould with unvulcanized tire tread composition so that the tread is formed with the required final pattern and retained thereby in the mould, shaping the radially inner surface of the tread to a first profile having a recess formed at each side with at least one step, the profile having a positively defined axial width narrower than the width of the tread to locate and accommodate completely a tread reinforcement breaker, locating the breaker completely in the recess while maintaining a constant circumferential length of the breaker, consolidating the tread and breaker assembly, shaping the radially inner surface of the assembly to a second profile having the shape required to accommodate a tire carcass, positioning a tire carcass, which is not fully shaped, within and coaxial to the annular tread mould, further shaping the carcass so that the carcass forms a crown which contacts and adheres to the second profile, completing the tire assembly, vulcanizing the assembled tire and removing the completed tire from the tread mould.

2. A method of building a pneumatic tire according to claim 1 wherein the tread mould is heated prior to filling the tread cavity with unvulcanized tread composition.

3. A method of building a pneumatic tire according to claim 1 wherein the tread cavity is filled by laying a strip of material into the cavity of the annular tread mould in a circumferentially-extending direction.

4. A method of building a pneumatic tire according to claim 1 wherein the tread composition is formed into a ring upon a support member, remote from the tread mould, the support member is moved axially into the tread mould and is expanded radially so as to fill the tread cavity with the ring of tread composition.

5. A method of building a pneumatic tire according to claim 1 wherein the tread composition in the tread cavity is consolidated into the mould and shaped to the first profile with recess therein by expanding a consolidating head comprising a substantially continuous rigid surface having a stepped cross-section against the ring of tread composition, pressing it into the composition in the mould and removing it to leave said first profile and recess.

6. A method of building a pneumatic tire according to claim 1 wherein the breaker comprises two or more layers of breaker reinforcement fabric and the layers are fitted into the prepared recess one at a time.

7. A method of building a pneumatic tire according to claim 1 wherein the breaker comprises two or more layers of breaker reinforcement fabric and the layers are assembled together on a carrier member remote from the tread mould to form a breaker sub-assembly which is then fitted into the tread recess in a single fitting operation followed by a single consolidation and profiling operation to prepare for the further tyre components.

8. A method of building a pneumatic tire according to claim 6 wherein the breaker fabric is joined end-to-end to form each layer of breaker.

9. A method of building a pneumatic tire according to claim 6 wherein each breaker layer is formed by circumferentially winding a single tire cord to build up the required breaker width.

10. A method according to claim 6 wherein the breaker layer is folded so as to give a package of reduced overall diameter and after it is positioned concentrically within the tread mould the package is unfolded to locate in the recess in the tread.

11. A method of building a pneumatic tire according to claim 1 wherein a breaker cushion is fitted after consolidating and shaping the radially inner surface of the tread and breaker assembly and the sub-assembly then formed is shaped to said second profile having the shape to accommodate the tyre carcass.

12. A method of building a pneumatic tire according to claim 11 wherein the carcass which is shaped and adhered to the second profile is a partially assembled carcass and bead chafer strips, toe strips and heel strips are fitted asfter assembly of carcass and the tread breaker assembly.

13. A method of building a pneumatic tire according to claim 13 wherein each strip fitted after said assembly is shaped to its final required shape prior to assembly of said strip to the assembly.

14. A method of building a pneumatic tire according to claim 1 wherein vacuum is applied to remove air from between the mould and components of the tire.

15. A method of building a pneumatic tire according to claim 1 wherein the recess is shaped to accommodate a breaker belt comprising two or more layers of differing widths.

16. An apparatus for building a pneumatic tire comprising an annular tread mould having a tread cavity to take tread composition to form a tire tread, first consolidating and shaping means to shape the radially inner surface of the tread to a first profile having a recess therein, means for locating a breaker completely into the recess while maintaining a constant circumferential length of the breaker and second consolidating and shaping means to shape the radially inner surface of the tread and breaker assembly to a second profile which is shaped to accept a tire carcass.

17. Apparatus according to claim 16 wherein the means for filling the cavity with tyre tread composition comprises a cylindrical carrier drum which is diametrally expandable.

18. Apparatus according to claim 17 wherein the drum has a carrier surface comprising an air bag and means are provided to allow inflation to expand the carrier surface diameter.

19. Apparatus according to claim 16 wherein the means for fitting the breaker comprises a cylindrical carrier drum which may be folded so that its outer radius varies but the circumferential extent of the carrier drum remains constant such that the breaker may be reduced in overall diameter for fitting into the tread mould.

20. Apparatus according to claim 19 wherein at least two carrier drums are provided for fitting breaker components to provide for assembly of a multiple layer breaker layer-by-layer into the tread.

21. Apparatus according to claim 20 wherein for shaping the first profile and recess on the inner surface of the tread, there are provided at least two shaping means are provided one for each breaker layer.

22. Apparatus according to claim 16 wherein each shaping means comprises a substantially continuous cylindrical surface having a cross-sectional shape of the required profile which is radially expandable.

23. Apparatus according to claim 16 wherein the filling, fitting and shaping means are each mounted in service units.

24. An apparatus as claimed in claim 16 wherein the means for locating the breaker in the recess comprises a circular band of reinforced rubber material moulded upon a series of supporting members comprising cylindrical bosses and segments which are radially moveable, the segments having an outer arcuate surface of the same radius of curvature as the circular band and are biased by springs radially outwardly so that radially inward movement of the bosses can deform the band and move the segments inwards against the spring bias.

* * * * *